March 13, 1945.  J. C. HEINTZ  2,371,238
RIM-CENTERING MEANS
Filed Feb. 8, 1943

Inventor
James C. Heintz

Patented Mar. 13, 1945

2,371,238

UNITED STATES PATENT OFFICE 2,371,238

RIM-CENTERING MEANS

James C. Heintz, Lakewood, Ohio

Application February 8, 1943, Serial No. 475,068

6 Claims. (Cl. 18—18)

This invention relates to an improved type of horizontal, full circle retreading mold and more particularly to such a mold provided with means for centering a tire therein. It includes the method of centering a tire therein.

In the full circle retreading molds now employed, no tire-centering means is used and as a result the new treads formed on the tires retreaded therein are apt to be somewhat off-center. Although these off-center treads have been recognized as objectionable in retreaded passenger, truck and bus tires, the tires have been usable. In retreaded airplane tires, off-center treads are very objectionable. The invention therefore relates particularly to the retreading of airplane tires but includes the retreading of passenger, truck and bus tires.

Figure 1:
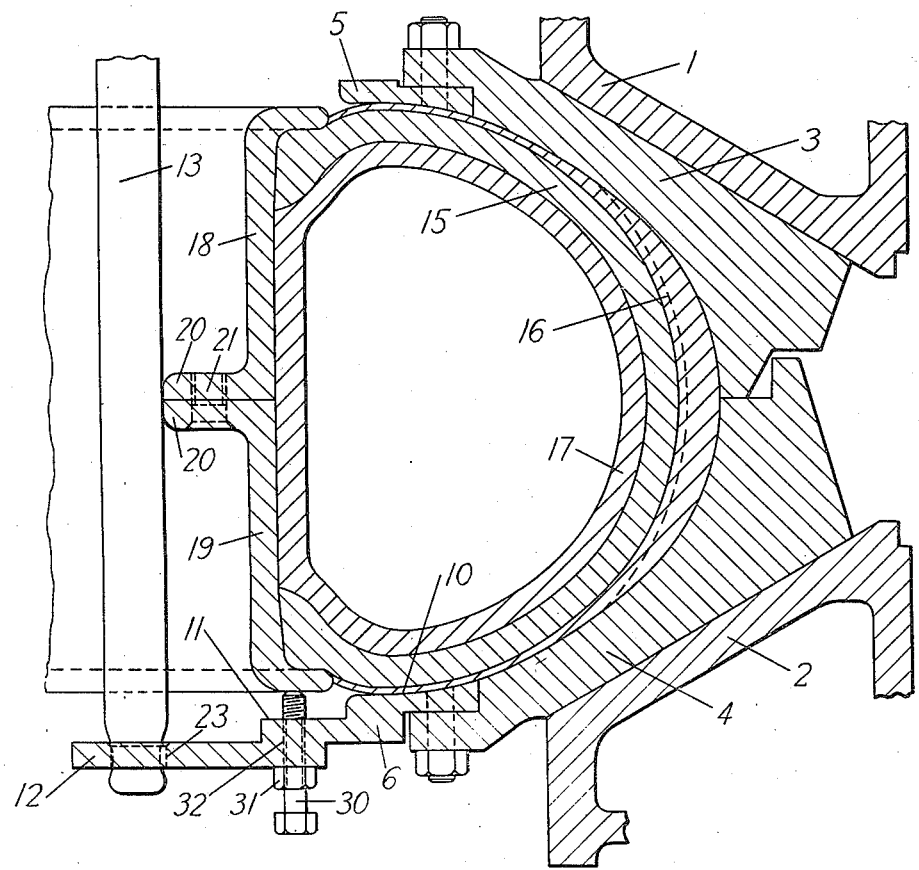
Figure 2:
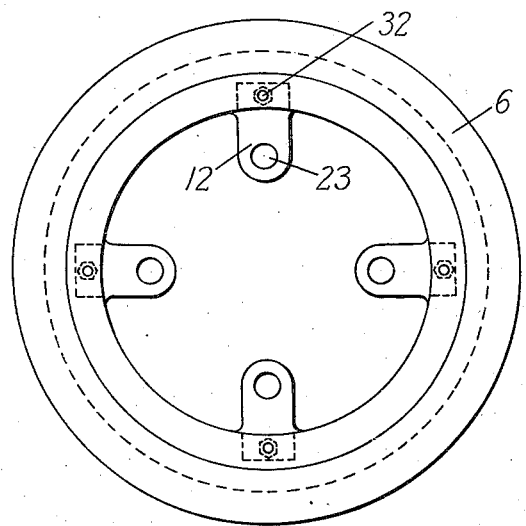

The invention will be more particularly described in connection with the accompanying drawing in which Fig. 1 is a sectional view through a mold equipped with rim-centering means and Fig. 2 is a plan view of the lower side-wall ring of the mold on a somewhat reduced scale.

The drawing is intended to represent any usual type of horizontal, full circle retreading mold. It comprises steam chambers 1 and 2 and retreading matrices 3 and 4. These matrices are of the usual type and may extend only to the shoulders. Separate matrices for the tread and side wall may be employed. The matrices illustrated in the drawing are designed particularly for retreading an airplane tire and include the side wall matrices 5 and 6. The upper side wall matrix 5 is an annular ring. The lower side wall matrix 6 is shown on a reduced scale in Fig. 2. It comprises the surface 10 which contacts with the side wall of the tire, the surface 11 which is preferably stepped down somewhat from the surface 10 and the lugs 12 which project inwardly from the latter and are used in connection with a seating bar 13.

The carcass of the tire is identified by the numeral 15. The dotted line 16 indicates the line of separation between the old and new rubber in the tread. The tire is mounted on a rim when it is fitted into the mold and heat and pressure are applied from within as usual by means of the steam bag 17.

The rim shown in the drawing is formed of two parts, 18 and 19. Each part is provided with a central flange 20. The flanges are bolted together by bolts 21.

The lugs 12 which project inwardly from the lower side-wall ring each comprise one or more holes 23 into which the lower end of the seating bar 13 fits. In fitting the tire into the mold, pressure is applied against the rim in any direction by pressing the seating bar against the flanges 20. In this way any portion of the tire may be squeezed in the mold to aid in forcing the part of the tire opposite the squeezed portion into place and in allowing it to assume its normal unstrained position in the mold. The use of a seating bar to assist in getting a tire into a mold is described in my Patent 2,038,736 on Work fitter for tire vulcanizers.

In order to center the tire in the mold adjusting screws 30 are threaded through the holes 32 in the lower side-wall ring. They are locked in place by lock nuts 31. Three or four such adjusting screws are ordinarily employed. As shown in Fig. 1 the rim on which the tire to be retreaded is mounted, rests on these adjusting screws. By proper adjustment of the screws the rim is centered in the mold. The screws are adjustable so that rims of different widths may be properly centered. When the tire being retreaded is mounted on a wide rim the adjusting screws 30 will be lowered and when it is mounted on a narrow rim the adjusting screws will be raised. In all cases they will be adjusted so that the rim is centered in the mold.

In the preferred method of placing a tire in the mold the screws 30 are adjusted to center the rim. Then with the aid of the seating bar the tire is forced into the mold and worked back and forth in the mold until it assumes a normal unstrained position therein with the center line of the tread lying in the horizontal plane which bisects the mold. Unless the tire is worked back and forth with the seating bar after it is forced into the mold the friction of the tire against the matrix of the mold will prevent the tire from centering in the mold. By forcing the tire against one portion of the mold with the seating bar, and then against another portion, the friction of the circumferentially opposite portions of the tire against the mold is reduced or entirely done away with, and the tire assumes a position in the center of the mold. After the tire is thus centered in the mold the new tread is cured. The new tread formed in this way will be properly centered on the tire.

I claim:

1. In a horizontal full circle tire retreading mold and associated with the lower half of the mold, means for contacting the rim on which the tire to be retreaded is mounted and adjusting the height thereof with respect to the molding surfaces of the mold, a seating bar, and means to cooperate with one end of the seating bar in seating the tire in the mold.

2. In a horizontal full circle tire mold for retreading a tire mounted on a rim, a lower side wall ring having at least three threaded holes located in a circle and in each of said holes an adjusting screw, the holes being so positioned that the rim on which the tire to be retreaded is mounted rests on the adjusting screws.

3. In a horizontal full circle tire mold for retreading a tire mounted on a rim, a lower side wall ring having at least three threaded holes arranged in a circle through which adjusting screws are threaded on which the rim on which the tire to be retreaded is mounted, is adapted to rest, a seating bar, and projecting inwardly of said circle lugs and in connection with each lug means adapted to cooperate with one end of the seating bar in seating the tire in the mold.

4. In a horizontal full circle tire mold for retreading a tire mounted on a rim, a lower side wall ring having at least three threaded holes arranged in a circle through which adjusting screws are threaded on which the rim on which the tire to be retreaded is mounted, is adapted to rest, a seating bar, and projecting inwardly of said circle lugs in each of which there is a hole into which one end of the seating bar is adapted to fit.

5. The process of placing in a full circle tire retreading mold a rim-mounted tire with an unvulcanized full circle retread thereon, which comprises centering the rim of the tire with respect to the mold, and after placing the tire in the mold but without centering it therein forcing the rim and the tire mounted thereon radially outward toward one portion of the mold, and then toward another portion to thereby relieve strains in the tire caused by friction of the tread of the improperly centered tire against the mold in order to thus reduce or relieve the friction and center the tire in the mold.

6. A horizontal full circle tire mold for retreading a tire mounted on a rim, a lower matrix on which the tire rests during the retreading operation, an annular member rigid with said matrix and extending from said matrix inwardly toward the axis thereof, a plurality of holes in said member, and an adjusting screw in each of said holes, said holes and screws being so positioned that the latter support the rim whereby the screws may adjust the height and center the rim in the mold.

JAMES C. HEINTZ.